(12) United States Patent
Fields

(10) Patent No.: US 8,142,092 B1
(45) Date of Patent: Mar. 27, 2012

(54) TIRE SHINER DEVICE AND METHOD OF USE

(76) Inventor: Geoffrey W. Fields, Bowling Green, KY (US)

(*) Notice: Subject to any disclaimer, the term of this patent is extended or adjusted under 35 U.S.C. 154(b) by 617 days.

(21) Appl. No.: 12/362,650

(22) Filed: Jan. 30, 2009

Related U.S. Application Data

(60) Provisional application No. 61/025,762, filed on Feb. 2, 2008.

(51) Int. Cl.
*A46B 15/00* (2006.01)

(52) U.S. Cl. .......................................... 401/9

(58) Field of Classification Search .............. 401/9–11
See application file for complete search history.

(56) References Cited

U.S. PATENT DOCUMENTS

| | | | |
|---|---|---|---|
| 2,318,996 A | | 5/1943 | Holmes |
| 3,346,895 A | * | 10/1967 | Consolo .................. 15/53.2 |
| 4,072,429 A | * | 2/1978 | Terzian et al. .............. 401/146 |
| 4,091,493 A | | 5/1978 | Weiss |
| 5,125,981 A | | 6/1992 | Belanger et al. |
| 5,216,774 A | | 6/1993 | Hill et al. |
| 6,260,225 B1 | | 7/2001 | Bowman |
| 6,383,295 B1 | * | 5/2002 | Frederick et al. ............. 118/680 |
| 6,461,685 B2 | | 10/2002 | Gorra |
| 2007/0215179 A1 | | 9/2007 | Mendenhall |

FOREIGN PATENT DOCUMENTS

| | | |
|---|---|---|
| EP | 0304193 | 2/1989 |
| JP | 59192654 | 11/1984 |

* cited by examiner

*Primary Examiner* — Huyen Le
(74) *Attorney, Agent, or Firm* — Laura M. Hagan

(57) ABSTRACT

A tire shiner device used in automatic carwash applications including a dual sectioned conservation reservoir designed to reapply excess shiner fluid to a rotary brush by orienting the reservoir in close proximity to the rotating circumference of the brush allowing the brush to sweep along the surface of the reservoir and thereby continually maintaining a desired level of saturation. The dual-sectioned reservoirs containing the excess fluid for reapplication can each be adjusted manually or optionally spring-loaded to provide a consistent contact between the rotary brush and the reservoir as the brush warps or wears. Additionally, the tire shiner device confines the shiner fluid application to the tire sidewall region using a containment shield to help prevent unwanted application to the car wheels or body.

9 Claims, 6 Drawing Sheets

TIRE SHINER DEVICE AND METHOD OF USE

This utility application claims priority to provisional application, Ser. No. 61/025,762 filed on Feb. 2, 2008.

BACKGROUND OF THE INVENTION

For years, vehicle-washing services have been used by consumers to clean the external surfaces of vehicles as they are driven or conveyed through automatic carwashes. Due to advances in technology, optional features that were once manually applied have been integrated into automatic carwash systems. More specifically, tire-shining options that once required an attendant are today automatically applied with elongated rotary brushes or sponges as an optional stage in the carwash process.

Commonly, motorized rotary brushes are moved into contact with lower tire sidewalls of a conveying vehicle as shiner product is sprayed onto the rotating brush and/or directly onto the tires. While the rotational motion of the brush allows the sidewalls of the tires to, be further cleared of debris and shined, the shiner fluid is often misappropriated to the wheel or body of the vehicle. The corrosive or unattractive appearance of tire shiner applied to unintended surfaces detracts from the beneficial qualities gained by the automatic addition.

Having single spray nozzles spaced behind the brush or aimed toward the vehicles tire, dry spots often occur in the rotary brushes in which rinsing before each use is required to removed dried cleaner from the rotary brush. When brush dryness occurs, the amount of friction between the tire and brush increases, resulting in premature wear and poor appearance of the final product. However, rinsing the brush is only marginally effective in removing dried tire shiner and the saturation of the brush with water makes the adherence of newly introduced tire shiner difficult and results in a diluted shiner solution having less than optimal results.

Further limitations pertain to excess waste and misappropriation of tire shiner fluid during the tire-shining phase. In the past, excess solution loss from the tire shiner process was considered an unavoidable loss, which resulted in a combination of lost proceeds, higher consumer costs and potential environmental concerns. Additionally, excess fluid lost in the spray mist or discharged from the rotary brush due to centrifugal force and the rinsing cycle create excess waste product application on unwanted surfaced. Therefore, a current need for a tire shiner device that is both precise in application and prevents excess waste exists in the art.

SUMMARY OF THE INVENTION

The present invention provides a tire shiner device, which automatically applies tire shiner fluid to tire sidewalls of a vehicle as it is conveyed through an automatic carwash. The tire shiner device of the present invention provides a consistent shiner application resulting in a high quality shine to the tires of consumer vehicles while preventing excess waste associated with run-off and increased consumer cost. Additionally, the tire shiner device confines the shiner fluid application to the tire sidewall region to help prevent unwanted application to the car wheels or body.

One of the novel improvements set forth in the present invention include the addition of a containment shield placed above the motorized rotary brush to prevent upward spray of shiner fluid. Secondly, a dual sectioned conservation reservoir cups the undersurface of the rotary brush collecting excess fluid from saturated sections of the rotary brush and spray nozzles. The conservation reservoir is in close enough proximity to the rotary brush to allow the external surface of the brush to sweep the internal arc of the conservation reservoir. The excess shiner fluid is then recycled as needed for additional brush saturation and consistent application.

The dual sections of the conservation reservoir are adjacent to one another in the approximate center of the elongated rotary brush and possess a rubberized brim on both sides of each section to contain the fluid therein. Behind the reservoir, adjustable or spring-loaded bolts are located near the ends of each reservoir section, which allows each section to be adjusted about a horizontal hinge. Manual adjustments allow the reservoir sections to stay in continual contact with the rotary brush as the circumference of the brush decreases with wear, or minor warping occurs. The inclusion of spring-loaded adjustment means allows the individual reservoir sections to maintain continual contact with the outer surface of the rotary brush. These novel enhancements of the current invention are further described in the detailed description and drawings.

DETAILED DESCRIPTION

In the following description, numerous specific details and options of the present invention are set forth in order to provide a more thorough understanding of the claimed invention. It will be appreciated, however, by one skilled in the art that the tire shiner device may be practiced without such specific details or optional components and that such descriptions are merely for convenience and as such solely selected for the purpose of illustrating the invention. Reference to the figures showing embodiments of the present invention are made to describe the invention and do not limit the scope of the disclosure herein. Additionally, it should be understood that the tire shiner device of the present invention is disposed on both the right side and left side of automatic conveying carwashes. Due to the mirrored appearance of the device, only the left side device will be described in detail as a representative of the structurally duplicated right side.

Figure 1:
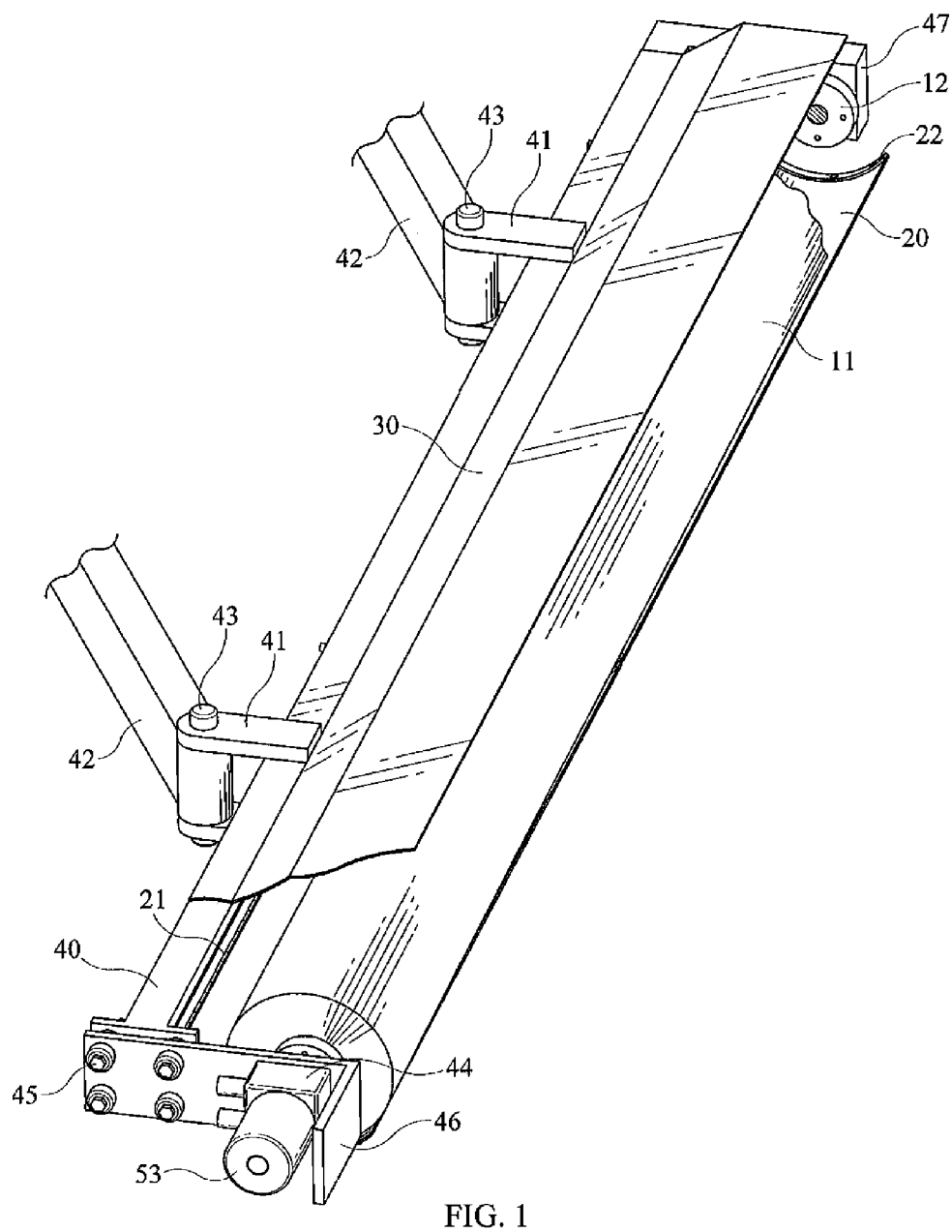
FIG. 1 shows a perspective view of tire shiner device.

As shown in FIG. 1, the primary structure 40 of the tire shiner device is that which all other components as claimed in the present invention are directly attached or stabilized thereto. The primary structure 40 is essentially an alloy I-beam configuration connected to translational arms 42 via four elongated projections 41. The two upper elongated projections 41 and two lower elongated projections 41 are parallel, and equally distributed, on the upper and lower surface of the primary structure 40, as demonstrated in FIG. 1.

Vertical connection hinges 43 provide a pivotal connection means between the translational arms 42 and the elongated projections 41, which are disposed on the primary structure 40, also shown in FIG. 1. The connection hinges allow primary structure 40, and accompanying components, of the tire shiner device to maintain a parallel position to a conveying vehicle regardless of the width of a vehicle. The arc of the translational arms 42 provides the necessary extension of the remaining structures toward the lower sidewall of a vehicle as it is conveyed through the automatic car wash.

Figure 3:
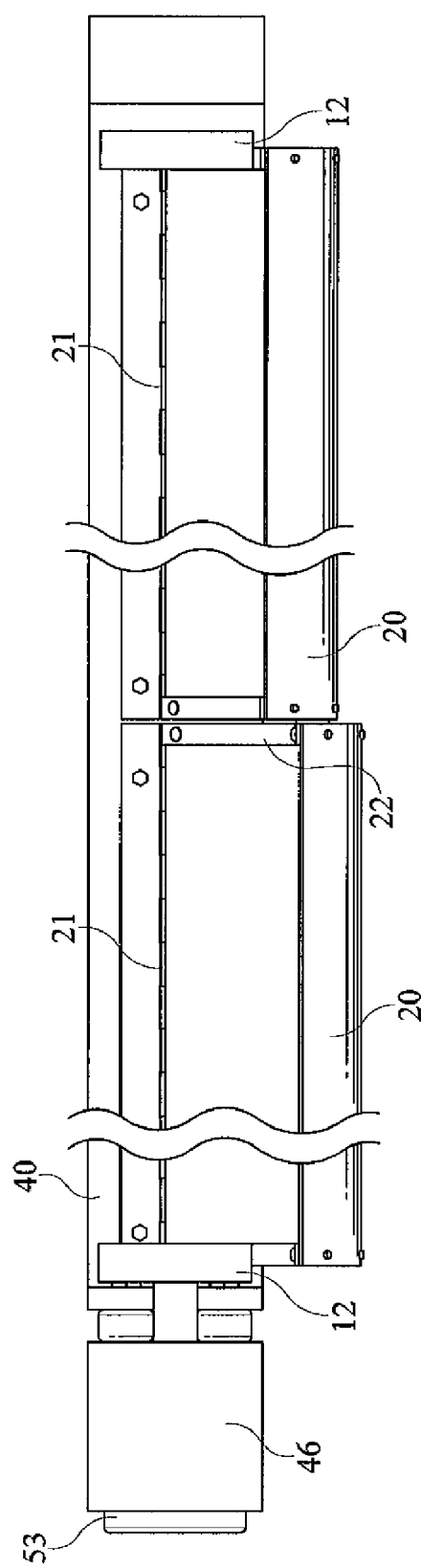
FIG. 3 is a forward view of the tire shiner device without the rotary brush, illustrating the hinged attachment of the conservation reservoir to the primary structure and the vertical independence of the dual sections as a result.
Figure 4:
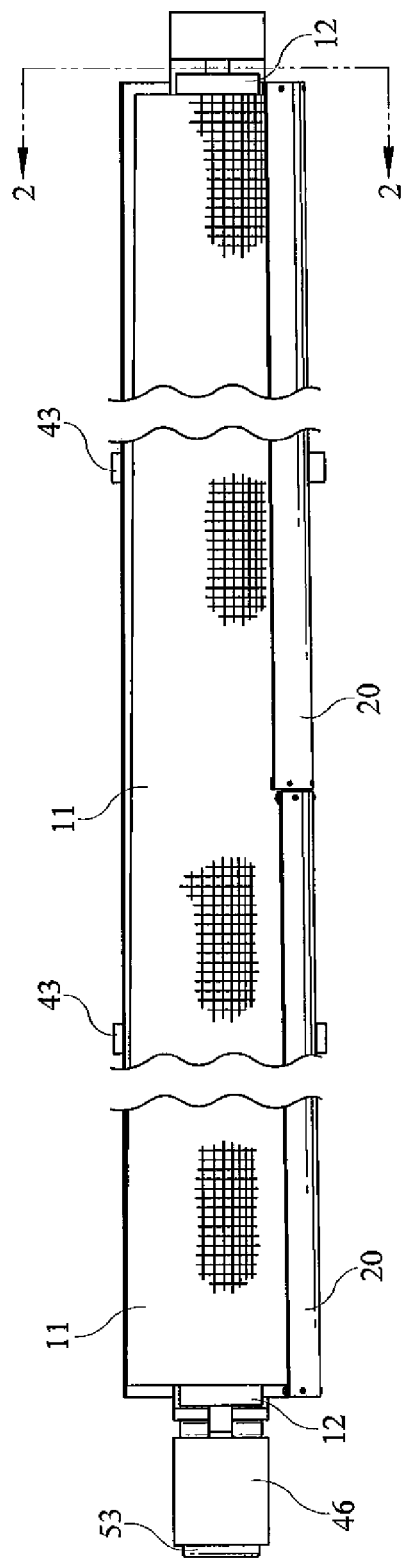
FIG. 4 shows a forward perspective view of the tire shiner device illustrating orientation of the brush within the device and referencing the FIG. 2 perspective.

A left side plate 46 and right side plate 47 are lateral projections from the primary structure's 40 respective ends and affixed perpendicularly with connection bolts 45 as shown in FIG. 1. The left side plate 46 is an essentially L-shaped alloy structure shown in FIG. 5 having the motor mount 44 and motor 53 externally affixed thereon. A brush mounting plate 12 is rotatably affixed to both the left side plate 46 and the right side plate 47 centered and parallel in respect to one another, as demonstrated in FIG. 3. The central shaft of a cylindrical rotary brush 11 is affixed within the two brush mounting plates 12 as shown in FIG. 4, and is mechanically operated by an axially aligned rotary motor 53, which rotates the brush 11 three hundred and sixty degrees with respect to the longitudinal axis.

Figure 2:
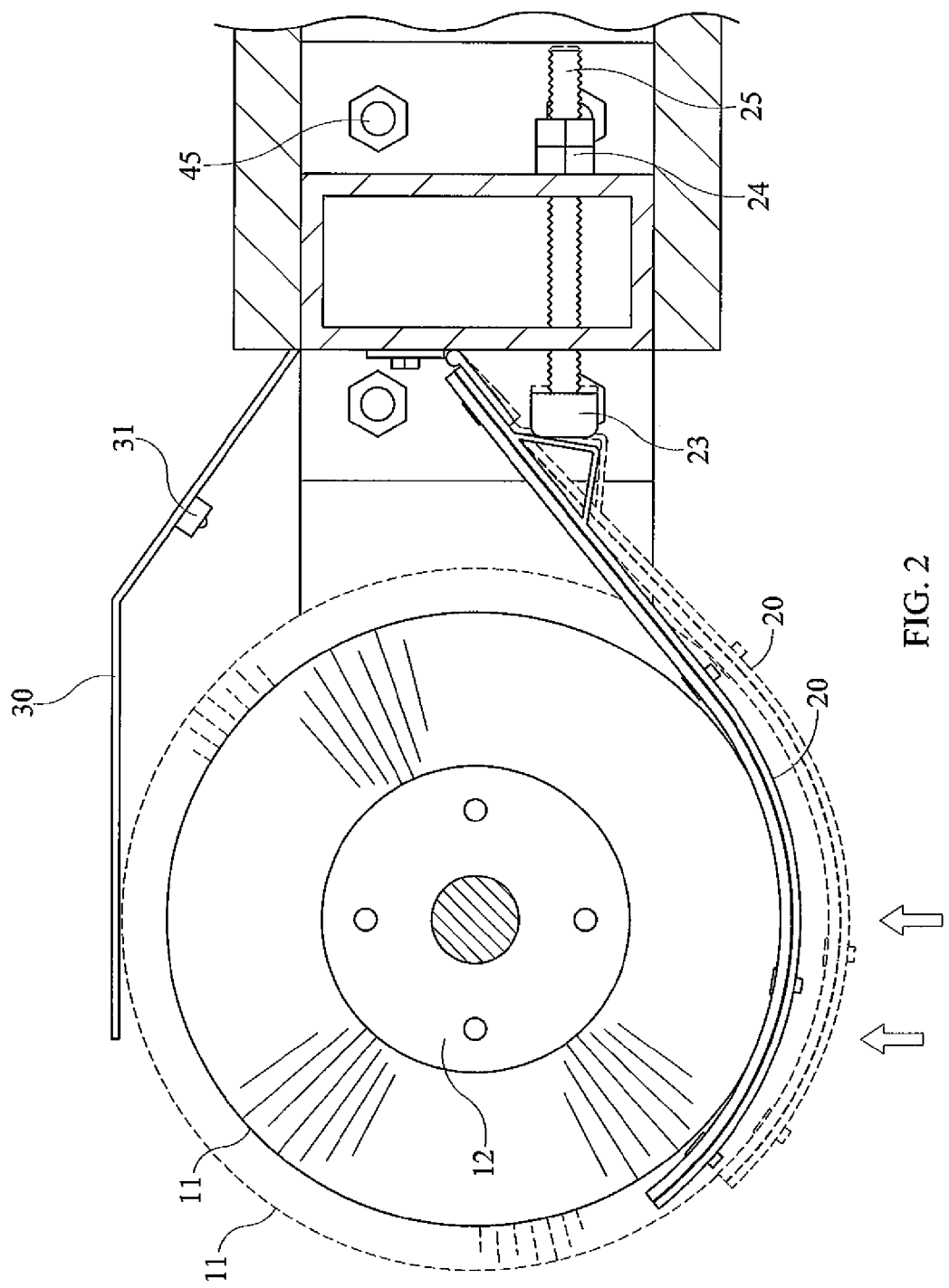
FIG. 2 shows a side view of the tire shiner device illustrating the motion of the conservation reservoir in conjunction with the adjustment bolt structures.

Affixed to the upper surface of the primary connection structure 40, a containment shield 30 made of plexi-glass, or similar material extends diagonally over the brush 11 and bends at an angle to terminate over the upper most location of the brush 11, as shown in FIG. 1 and FIG. 2. The containment shield 30 prevents shiner fluid from arcing from the brush prematurely, thereby preventing misappropriation of the shiner fluid to the wheels or body of a vehicle.

Figure 5:
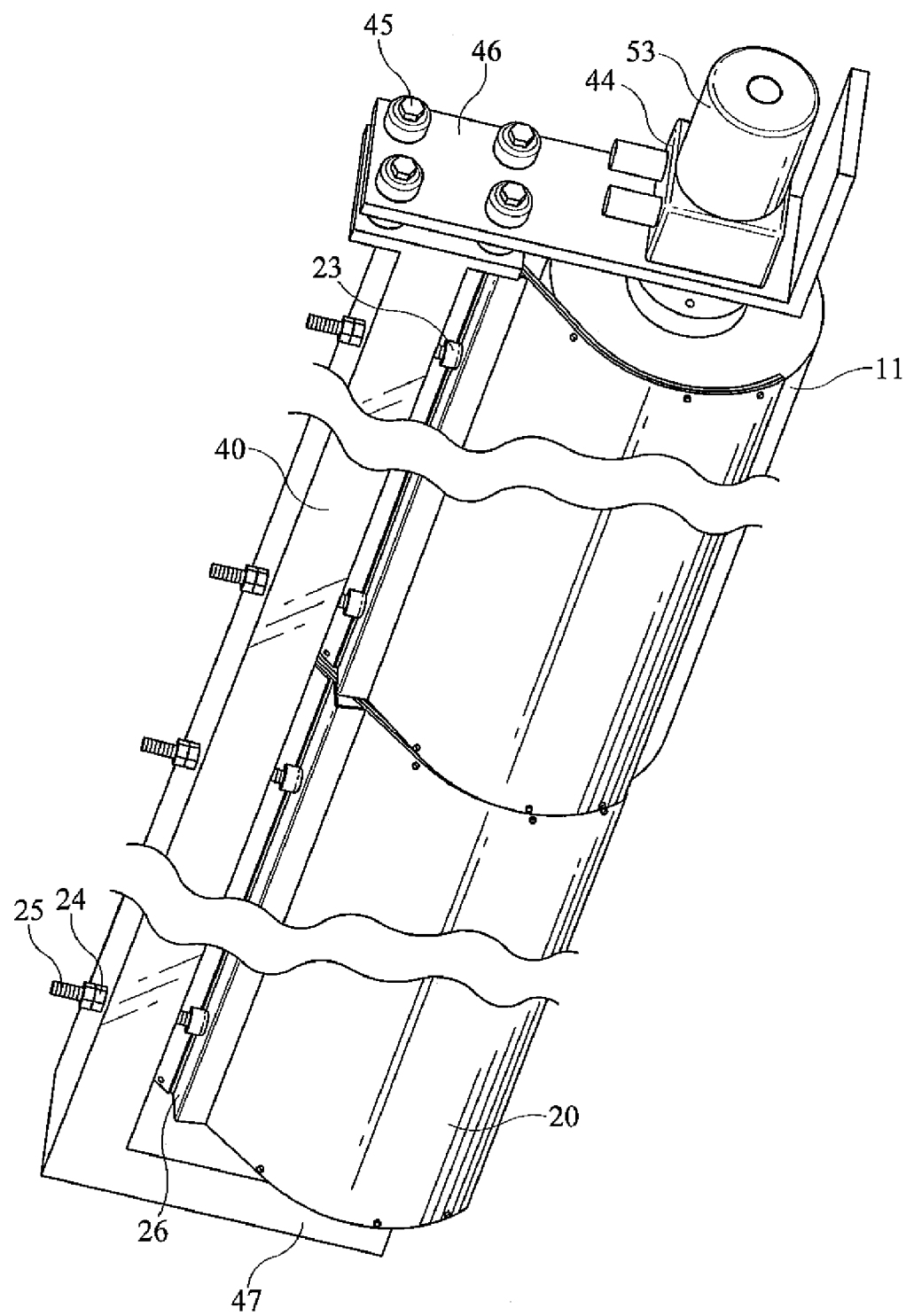
FIG. 5 shows a perspective view of the lower surface of the tire shiner device, more specifically illustrating the placement of the adjustment bolt structures and the sectioned conservation reservoir.

A dual-sectioned conservation reservoir 20 is connected to the undersurface of the primary connection structure 40 as demonstrated in FIG. 5. The attachment means of the dual-sectioned conservation reservoir 20 consisting of a pair of horizontal hinges 21, allowing each section of the conservation reservoir 20 independent vertical adjustment, as demonstrated in FIG. 2 and FIG. 3. A rubberized brim 22, or equivalent structure is disposed of each side of each conservation reservoir sections 20 to contain the excess fluid therein, as seen in FIG. 1.

Figure 6:
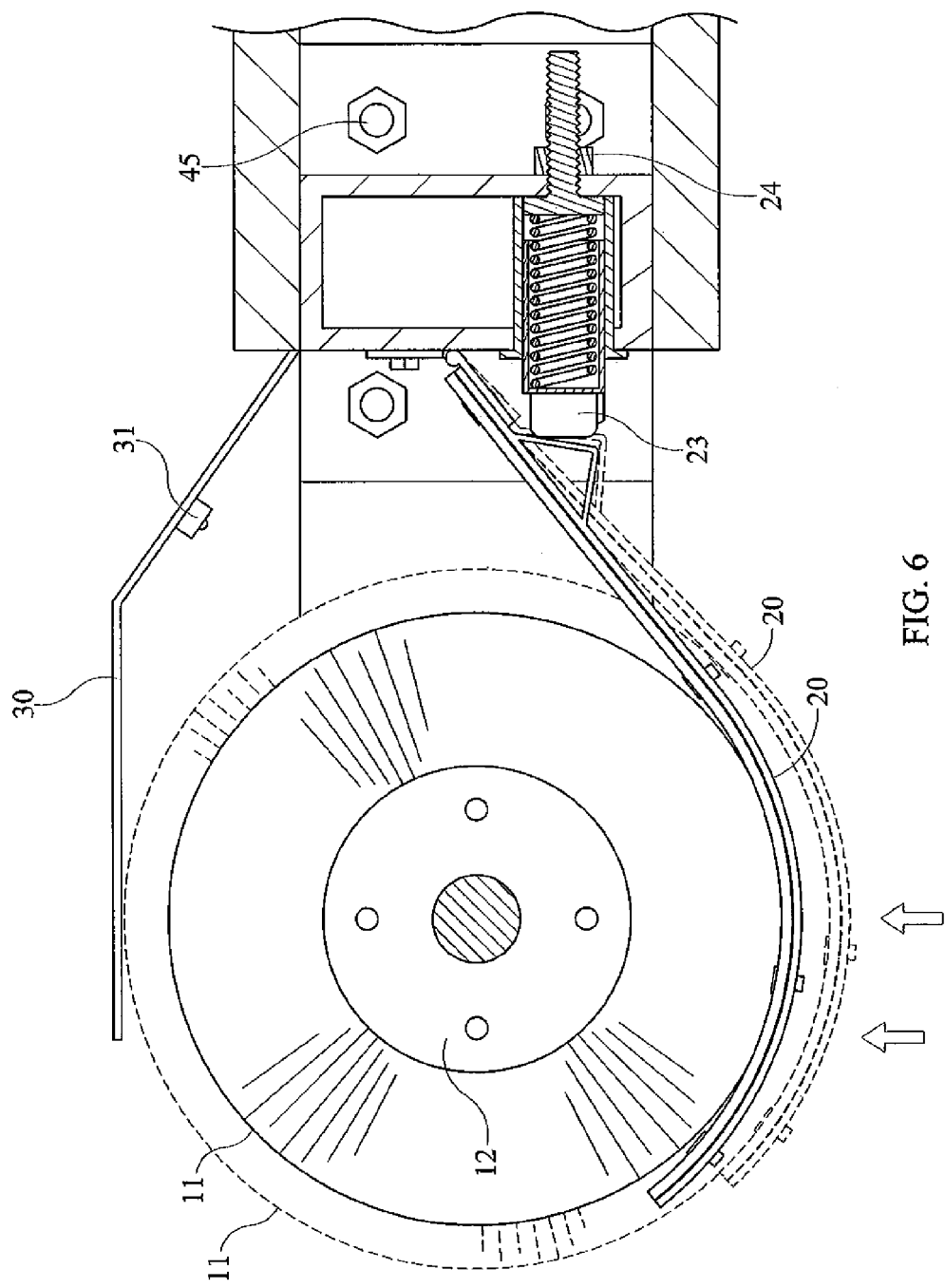
FIG. 6 shows a side view of the tire shiner device illustrating the motion of the conservation reservoir in conjunction with spring-loaded adjustment means.

A resistance structure 25, having an abutting end 23 and an adjustment means 24, applies perpendicular pressure to a horizontal L-shaped channel 26 of the conservation reservoir to provide the means in which the conservation reservoir 20 is maintained at the desired vertical height. One embodiment of the resistance structure 25, shown FIG. 5, includes a threaded bolt and an adjustment means 24, consisting of a nut. In this embodiment, the vertical height of the conservation reservoir 20 can be manually adjusted, as demonstrated in FIG. 2. An additional embodiment includes a self-adapting adjustment means 24 comprising a compressed spring by which the abutting end 23 is pushed into contact with the L-shaped channel 26 of the conservation reservoir 20, shown in FIG. 5, encouraging vertical movement of the hinged conservation reservoir 20 as the rotary brush 11 wears or warps as demonstrated in FIG. 6.

What is claimed is:

1. A tire shining apparatus for applying a solution to a tire of a vehicle comprising:
    a primary connection structure upon which a rotary brush is mounted;
    translational arms used to position said brush into contact with the sidewall of vehicle tires;
    a plurality of spray nozzles depending from said primary connection structure; and
    a conservation reservoir mounted to said primary connection structure, said conservation reservoir extending from said primary connection structure to cup said rotary brush on its undersurface.

2. The tire shining apparatus of claim 1 wherein the said solution comprises shining fluid, dressings or additional solutions used in the shining and cleaning of tires.

3. The tire shining apparatus of claim 1 further comprising a containment shield statically affixed to said primary connection structure and adjacent to said rotary brush.

4. The tire shining apparatus of claim 1 wherein the said conservation reservoir is comprised of more than one independent vertically hinged sections.

5. The tire shining apparatus of claim 1 wherein resistance structures are adjustably engaged with said conservation reservoir, said resistance structure comprising:
    an abutting end; and
    an adjustment means.

6. The tire shining apparatus of claim 5 wherein said resistance structures are manually adjusted.

7. The tire shining apparatus of claim 5 wherein the said resistance structure is self-adjusting.

8. A method for conserving tire cleaning and shining solution applied with rotary brushes in automatic carwashes comprising the steps of:
    positioning a dual sectioned conservation reservoir under the said rotary brush wherein the outer circumference of the said rotary brush makes sweeping contact with the said conservation reservoir sections as it rotates therein;
    providing a hinged attachment to the said conservation reservoirs;
    introducing resistance structures to engage and pivot the said hinged attachments of each conservation reservoir section independently;
    controlling the vertical placement of the said conservation reservoir sections with resistance structures to maintain contact between the said conservation reservoir and the rotary brush.

9. A method for wetting a rotary brush with tire cleaning and shining solution applied with rotary brushes in automatic carwashes comprising the steps of:
    positioning a plurality of spray nozzles oriented toward the said rotary brush;
    introducing the solution to said rotary brush, substantially wetting the said rotary brush;
    orientating a conservation reservoir below and in contact with said rotary brush to sweep along the internal surface of said conservation reservoir to rewet said rotary brush with excess solution contained therein.

* * * * *